(12) United States Patent
Kiel

(10) Patent No.: US 6,524,112 B1
(45) Date of Patent: Feb. 25, 2003

(54) INTERACTIVE ASTRONOMICAL SYSTEM AND METHOD

(76) Inventor: Martin K. Kiel, 50 Suda Way, Reno, NV (US) 89509

( * ) Notice: Subject to any disclaimer, the term of this patent is extended or adjusted under 35 U.S.C. 154(b) by 0 days.

(21) Appl. No.: 09/875,466

(22) Filed: Jun. 5, 2001

(51) Int. Cl.[7] ............................................. G09B 27/06
(52) U.S. Cl. ........................ 434/290; 434/291; 434/287
(58) Field of Search ................................. 434/276, 284, 434/285, 290, 291, 287, 288; 40/1, 427

(56) References Cited

U.S. PATENT DOCUMENTS

| | | | | |
|---|---|---|---|---|
| 532,370 | A | * 1/1895 | Gibbs | 434/276 |
| 1,189,141 | A | * 6/1916 | Lanneau | 434/285 |
| 1,293,837 | A | * 2/1919 | McHenry | 434/290 |
| 2,687,582 | A | * 8/1954 | Storz | 33/1 SA |
| 3,107,441 | A | * 10/1963 | Scott | 434/291 |
| 3,521,384 | A | * 7/1970 | Holland | 434/291 |
| 5,931,678 | A | * 8/1999 | Atzaba | 434/284 |

OTHER PUBLICATIONS

National Geographic Society, Holiday 2001 Gift Catalog, 4 pages, National Geogrpahic Society, US.

* cited by examiner

Primary Examiner—Kien T. Nguyen
(74) Attorney, Agent, or Firm—Rolando J. Tong; Ian F. Burns & Associates

(57) ABSTRACT

An interactive astronomical model includes a geocentric module, a heliocentric module, and a housing. The geocentric module has a central body configured to represent earth. The heliocentric module has a central axis configured to represent the sun. A housing is used to couple both the geocentric module and the heliocentric module. The invention also includes a method for generating an interactive astronomical model comprising the steps of providing a geocentric module having a central body configured to represent earth, providing a heliocentric module having a central axis configured to represent a sun; and coupling the geocentric module with the heliocentric module with a shared housing.

19 Claims, 6 Drawing Sheets

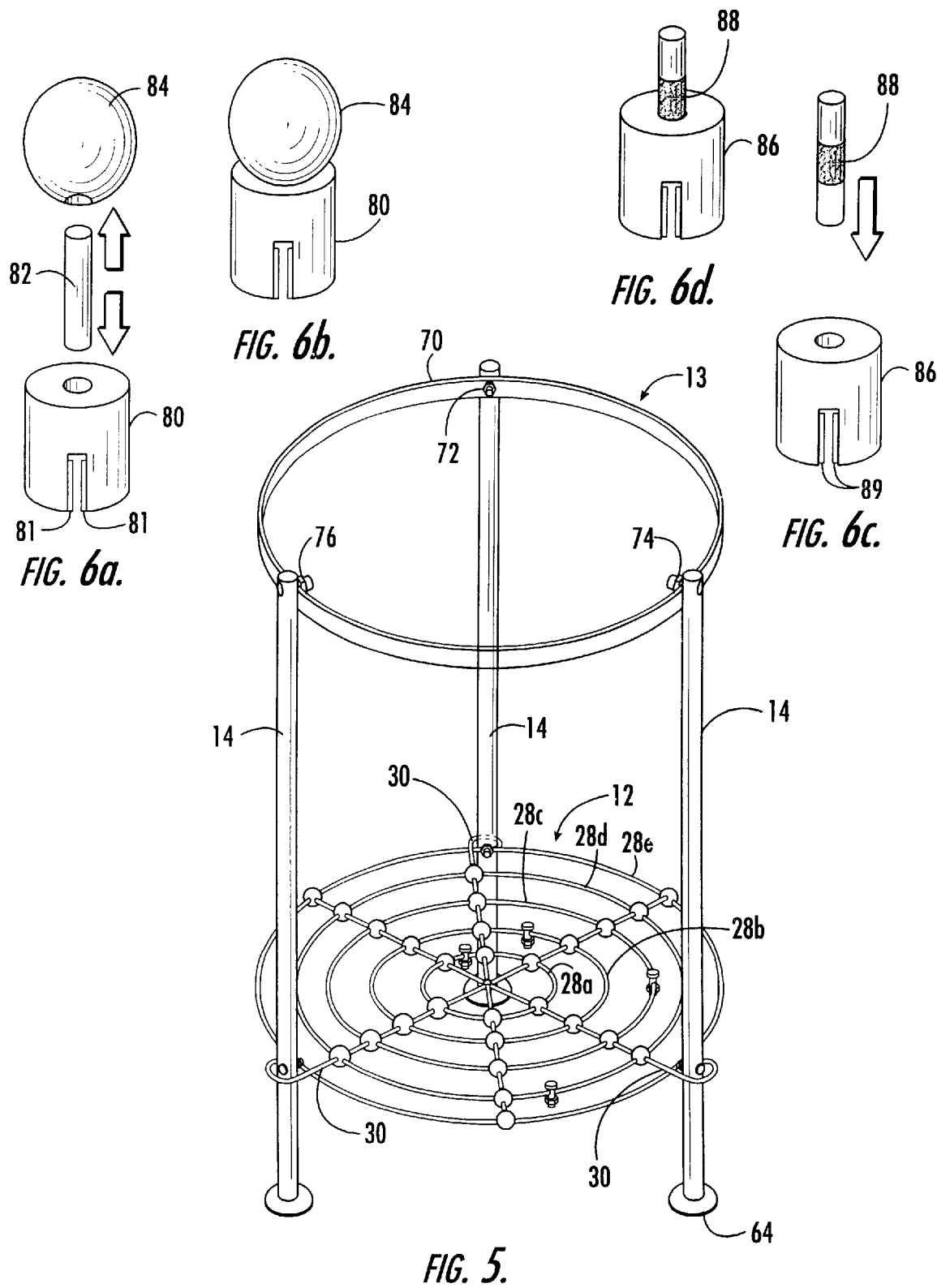

INTERACTIVE ASTRONOMICAL SYSTEM AND METHOD

CROSS REFERENCES TO RELATED APPLICATIONS

This patent application does not cross reference a related patent application.

BACKGROUND OF THE INVENTION

1. Field of Invention

The present invention relates to an interactive astronomical system and method. More particularly the present invention relates to an astronomical model that represents the astronomy of the sky from earth with geocentric module and a heliocentric module.

2. Description of Related Art

Astronomical models are commonly used as teaching tools to explain how the heavens take the shapes and forms associated with various celestial bodies. These celestial bodies include the moon, the sun, other planets in our solar system, and the stars, galaxies and constellations that make up the heavens. Astronomical models are used to help visualize the heavens around us.

The prior art teachings of astronomical models are broken up into two sets of models, i.e. geocentric models, and heliocentric models. Geocentric astronomical models refer to or relate to measuring from the earth's center or appearing as if seen from it. In a geocentric model the earth is the central planetary body, and the moon, sun, planets, stars and galaxies rotate around the earth. Heliocentric astronomical models refer to or relate to measuring from the sun's center or appearing as if seen from the sun's center. In a heliocentric model, the sun is the central planetary body and the planets of the solar system rotate about the sun.

For example, U.S. Pat. No. 3,107,441 describes a geocentric astronomical model. The geocentric view includes a simulated horizon that permits a person to visualize any selected point on earth and visually see the movements of simulated stars, sun, moon and planets relative to that point on earth. Additionally, the geocentric astronomical model allows the viewer to visually see the changing movement of the orbit of a simulated satellite.

An example of heliocentric astronomical model is provided in the Orrery of U.S. Pat. No. 3,733,720. The Orrery provides a mechanical model that demonstrates the movements of the planets around the sun. The mechanical model includes a central sun-carrying member, a plurality of annular planet carrying members, and a driving mechanism for driving the planets at different rotational speeds around the sun-carrying member.

Although the geocentric astronomical model and the heliocentric astronomical model each provide a helpful educational tool, it would beneficial to provide an astronomical model which can combine the educational benefits of both the geocentric model and heliocentric model in one astronomical model. Additionally, an educational tool that combines both the geocentric model and the heliocentric module in one housing and has planetary bodies that may be movably coupled to a plurality of rings is not known.

SUMMARY OF INVENTION

Advantages of the Invention

An advantage of the present invention is that it provides an interactive astronomical model having a geocentric module and a heliocentric module.

Another advantage of the present invention is that it provides an interactive astronomical model having geocentric and heliocentric module that is easy to assemble and affordable.

Another advantage of the present invention is that it provides a relational astronomical model that permits the viewer to compare the differences between a heliocentric viewpoint and a geocentric viewpoint.

Another advantage of the present invention is that is provides a geocentric module and a heliocentric module in a single housing.

Another advantage of the present invention is that heavenly bodies are movably coupled to one of a plurality of rings, thereby permitting easy movement of planetary bodies according to an astronomical chart.

These and other advantages of the present invention may be realized by reference to the remaining portions of the specification, claims, and abstract.

Brief Description of the Invention

The present invention is an astronomical model that includes a geocentric module, a heliocentric module, and a housing. The geocentric module has a central body configured to represent earth. The heliocentric module has a central axis configured to represent the sun. A housing is used to couple both the geocentric module and the heliocentric module. The geocentric module includes a plurality of first rings configured to surround the central body and configured to represent a plurality of geocentric orbits. Additionally, the geocentric module includes a plurality of first bodies, wherein each of the plurality of first bodies is movably coupled to of the plurality of first rings. The first rings include an ecliptic ring, an equatorial ring, and a plurality of meridian rings. The heliocentric module includes a plurality of second rings that surround the central axis of the heliocentric module and are configured to represent a plurality of heliocentric orbits. Additionally, the heliocentric module includes a plurality of second bodies. Each of the plurality of second bodies is movably coupled to one of the plurality of second rings and each of the plurality of second bodies represents a planet in the solar system. Preferably, the housing is embodied in a stand which is fixedly couples the geocentric module and the heliocentric module.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the modules set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 5 is substantially a perspective view of a housing having the heliocentric component.

FIG. 6a is substantially a perspective view of the assembly of a planet.

FIG. 6b is substantially a perspective view of the planet.

FIG. 6c is substantially a perspective view of the assembly of a star or planet.

FIG. 6d is substantially a perspective view of the star or planet.

DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made with out departing from the scope of the present invention.

The astronomical model of the present invention is a learning tool that describes various concepts. These concepts include demonstrating a coordinate system for locating stars, locating various constellations, understanding the path of the stars as they cross the sky and the earth rotates, understanding the path of the sun across the sky and the analemma, understanding the path of the moon across the sky, understanding the phases of the moon, understanding the solar and lunar eclipses, understanding the sunrise and sunset, understanding the moonrise and moonset, providing a three dimensional visualization of the relationship between the equatorial plane, the ecliptic plane, zodiac constellations, the four seasons, understanding the precession of the equinoxes and the changing North Star, understanding the horizon, understanding the different perspective of the celestial sphere from the North and South Hemispheres, understanding solar time and sidereal time, and understanding the orbits of the naked eye planets and their changing positions on the celestial sphere.

The Rings of the Astronomical Model

Figure 1:
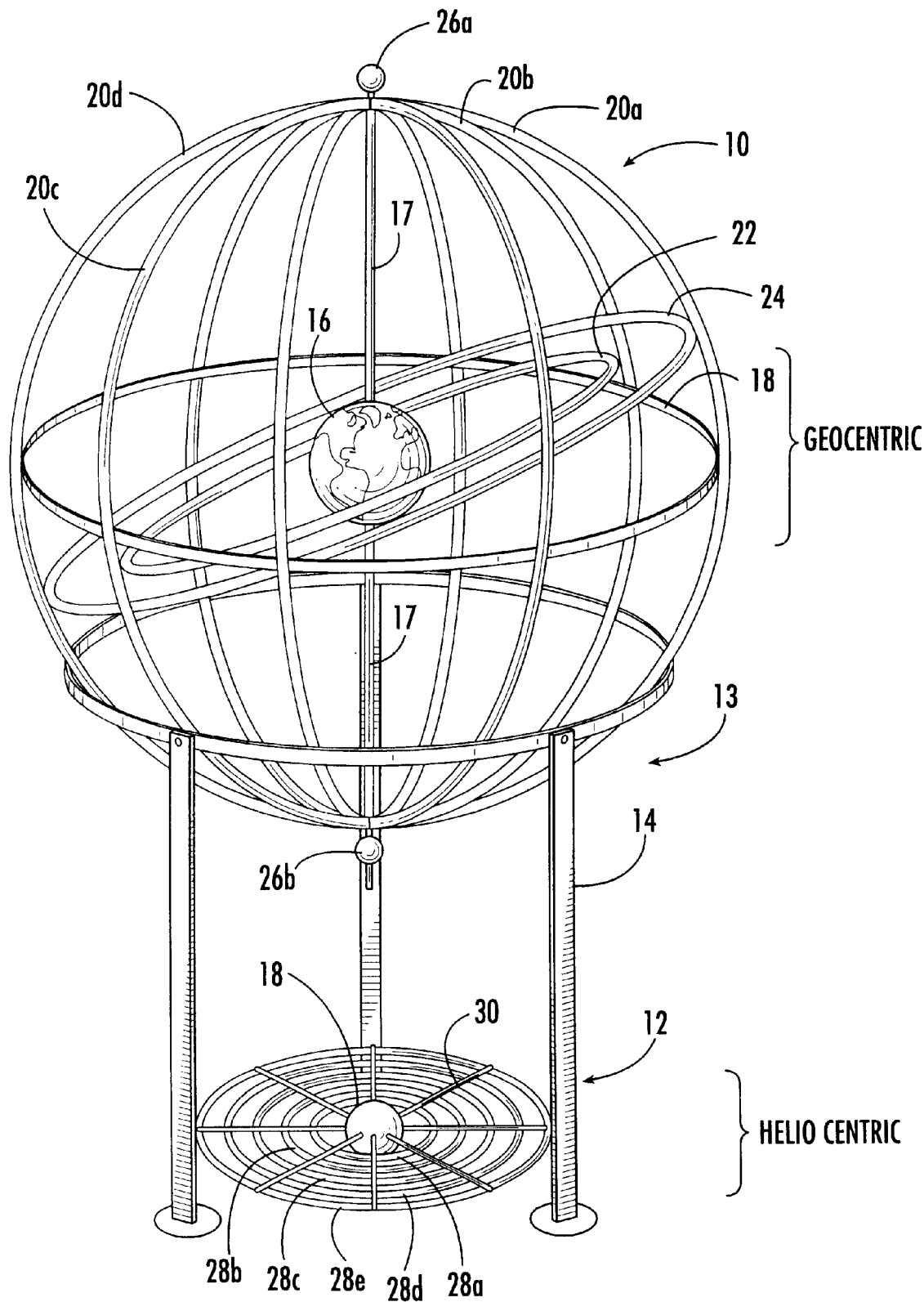
FIG. 1 is substantially a perspective view of an astronomical model having a geocentric module and heliocentric modules that are combined in one housing.

Referring to FIG. 1, the present invention comprises a geocentric module 10 and a heliocentric module 12. The geocentric module 10 and the heliocentric module 12 are fixedly coupled together by legs 14 which are part of a housing 13 that holds both modules together. The term housing as used in this patent application includes a frame that holds both the geocentric module 10 and the heliocentric module 12 together.

The geocentric module 10 uses the earth 16 as the central body that provides a reference for the viewer of the heavens. The earth 16 is rotatably coupled to a rigid rod 17a and 17b. The geocentric module 10 is comprised of a plurality of rings that include a celestial equator ring 18, a plurality of meridians 20, and an inner ecliptic ring 22 and an outer ecliptic ring 24. Preferably, each of the meridians and rings is made of cost-effective pliable plastic material that can be bent and can also be fastened to other materials. It shall be appreciated by those skilled in the art that the diameter of each of the meridians and rings will vary depending on the size of the geocentric module. Each meridian has a mirror meridian that in combination provide a meridian ring. The celestial equator ring 18 represents an outward extension of the earth's equator (not shown). The eight meridians 20 divide the geocentric module into 8 separate sections. For illustrative purposes, this description of the invention focuses on the meridians labeled 20a, 20b, 20c and 20d. Each of the meridians 20a through 20d define a semi-circular shape in which meridians 20a and 20d define a full circle and meridians 20b and 20c define a full circle. By way of example and not of limitation, the combination of meridians 20a and 20d provide a meridian ring. The combination of the meridians 20 and the celestial equator ring 18 provides a framework for fixably coupling galaxies, stars and constellations outside the earth's solar system to the geocentric module 10. The inner ecliptic ring 22 represents the path the moon takes when it revolves around the earth 16. The outer ecliptic ring 24 represents the path of the sun and the path of the planets within earth's solar system. Both the inner ecliptic ring 22 and the outer ecliptic ring 24 are at an angle of 23.5 degrees from the celestial equator ring 18.

The outer ecliptic ring 24 is fixedly coupled to the meridians 20. The inner ecliptic ring 22 is fixedly coupled to the outer ecliptic ring 24. Additionally, the celestial equator ring 18 is fixedly coupled to the meridians 20. The meridians 20 are.fixedly coupled to one another with fasteners 26a and 26b that are located at the North Celestial Pole and South Celestial Pole, respectively.

The heliocentric module 12 uses the sun 18 as the central body around which the solar system's planets revolve. The heliocentric module includes a plurality of heliocentric rings that represent the orbits of the planets visible from earth that revolve around the sun. More particularly, the plurality of heliocentric rings 28a, 28b, 28c, 28d, and 28e correspond to the orbital paths of planets such as Mercury, Venus, Earth, Mars, Jupiter and Saturn. It shall be appreciated by those skilled in the art of astronomy, that Mercury, Venus, Mars, Jupiter and Saturn are readily visible from Earth. In one embodiment, the heliocentric module 12 includes a plurality of wires 30 fixedly coupled to the legs of stand 14. Additionally, each of the plurality of wires 13 extends through the sun 18. The heliocentric module is described in further detail below.

The Bodies of the Astronomical Module

Figure 2:
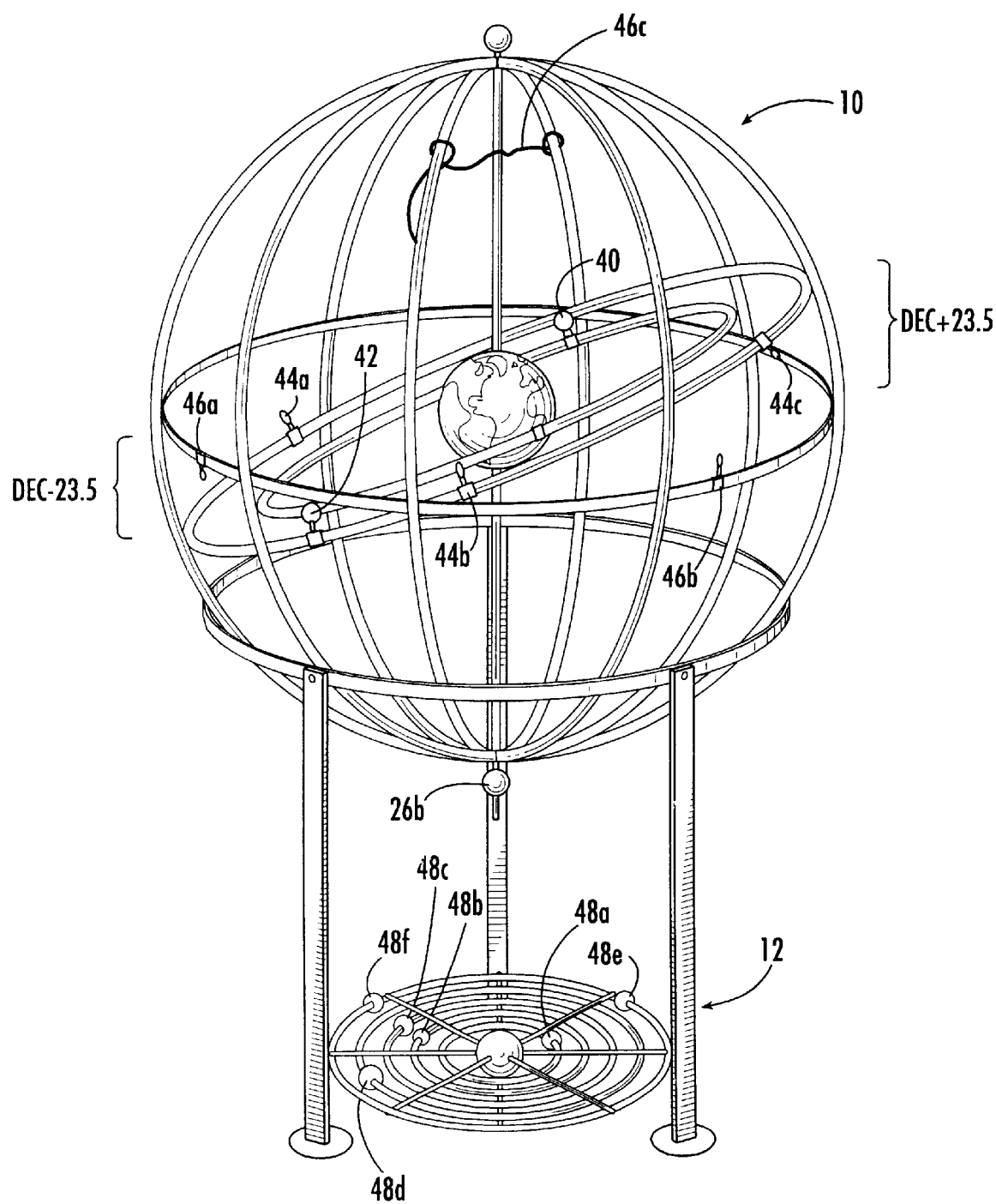
FIG. 2 is substantially a perspective view of FIG. 1 with a plurality of heavenly bodies that may moves along the geocentric module and the heliocentric module.

Referring to FIG. 2 as well as FIG. 1, a plurality of heavenly bodies is coupled to the rings of the astronomical model 10. More particularly, the heavenly bodies described by the astronomical model 10 include the moon, the sun, the planets of the solar system, the stars, the galaxies and the constellations of the heavens. It shall also be appreciated by those skilled in the art that the inner ecliptic 22 and outer ecliptic 24 are at 23.5 degree angle from the celestial equator 18.

The geocentric module 10 includes a moon 40 that is movably coupled to the inner ecliptic ring 22. Additionally, a sun 42 is movably coupled to the outer ecliptic ring 24. By way of example and not of limitation, a plurality of planets 44a, 44b and 44c from the solar system are also movably coupled to the outer ecliptic ring 24. The plurality of planets 44a, 44b and 44c are visualized by a viewer from the earth 16 as a plurality of stars. For illustrative purposes, at least one star 46a and at least one galaxy 46b can be visualized in the geocentric module 10 by movably coupling the at least one star 46a and the at least one galaxy 46b to the framework created by the celestial equator 18 and the meridians 20. Additionally, at least one constellation 46c such as the Big Dipper may be fixedly coupled to the meridians 20. Additional stars, galaxies, and constellations may be coupled to the meridians 20 and the celestial equator 18.

The heliocentric model 12 includes the sun 18 and earth 47 and the plurality of planets 48a, 48b, 48c, 48d and 48e which correspond to Mercury, Venus, Mars, Jupiter and Saturn, respectively. The heliocentric model 12 provides a relational tool that can be used to describe the plurality of planets 44a, 44b and 44c from the geocentric model 10. By way of example and not of limitation, the plurality of planets 44a, 44b and 44c may correspond the plurality of planets 48a, 48b, and 48c.

The Geocentric Module

Figure 3:
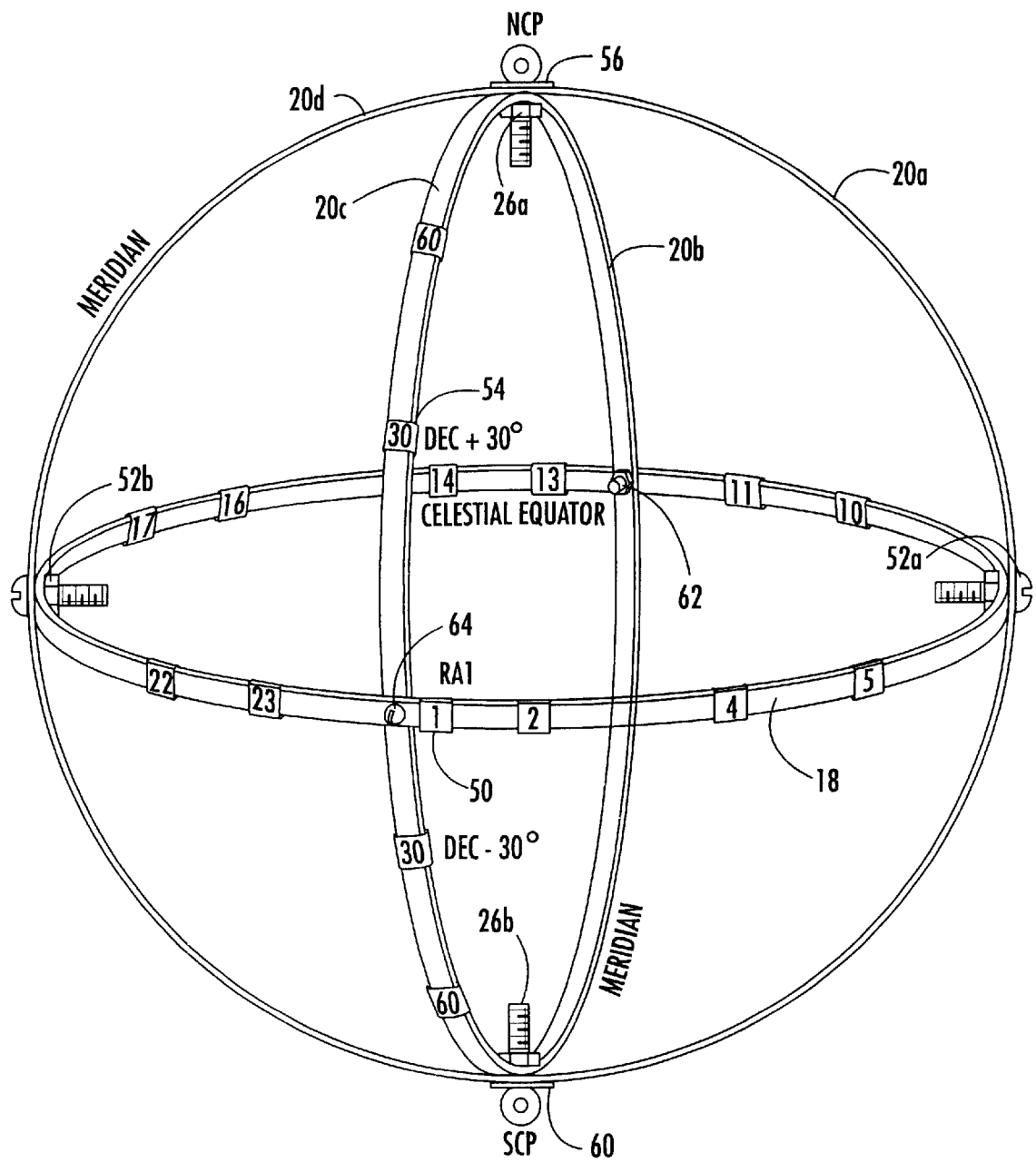
FIG. 3 is substantially a side view of the celestial equator and a meridian that are part of the geocentric module.

Referring to FIG. 3 as well as FIG. 1, there is shown the celestial equator 18 and four meridians. For illustrative purposes only four meridians out of the eight meridians shown in FIG. 1 are discussed in FIG. 3. These four meridians are meridians 20a, 20b, 20c and 20d of FIG. 1. Preferably, the celestial equator 18 is imprinted with a plurality of numbers 50 having a plurality of integers from of one to twenty-four. The plurality of numbers 50 are equally spaced along the celestial equator. The plurality of numbers 50 indicate the 24 hours of right ascension and correspond to the lines of longitude on earth. One hour of right ascension represents 15 degrees of the earth's rotation and therefore in 24 hours the earth rotates 360 degrees. It shall be appreciated by those skilled in the art that each hour of right ascension can be further divided into 60 minutes and each minute into 60 seconds; this is done to accurately locate the heavenly bodies in the geocentric module. In order to provide a cost effective astronomical model kit, the preferred astronomical model is not designed to provide detail on the order of minutes or seconds. However, it shall be appreciated by those skilled in the art that higher tolerances can be achieved for the geocentric module 10. Preferably, the celestial equator 18 is fastened with two fasteners at locations 52a and 52b. The locations 52a and 52b are also the location for right ascension 6 and 18, respectively.

The meridians 20a, 20b, 20c and 20d are labeled with a plurality of declination numbers 54. By way of example and not of limitation the declination numbers 54 are at 30 degrees and 60 degrees with a positive declination representing the Northern Hemisphere and a negative declination representing the Southern Hemisphere. The declination numbers 54 equate to the latitude of earth. It shall be appreciated by those skilled in the art of making astronomical models that a flexible material can be attached to the meridians at a specific declination such that the material will encircle the perimeter of the geocentric sphere, parallel to the celestial equator, thus describing a ring of equal declination. The meridians 20a, 20b, 20c, and 20d are fixedly coupled to one another at the intersection of the meridians 56 that also defines the North Celestial Pole (NCP). Additionally at the intersection of the meridians 56, the meridians are fixedly coupled together with a fastener 26a (see FIG. 1). The meridians 20a, 20b, 20c and 20d are also fixedly coupled at the intersection of the meridians 60 that defines the South Celestial Pole (SCP). At the South Celestial Pole the two meridians are fixedly coupled with a fastener 26b (see FIG. 1).

The meridians 20a, 20b, 20c and 20d are also fixedly coupled to the celestial equator 18. The meridian 20a is fixedly coupled to the celestial equator 18 at the right ascension 6 that is indicated by reference number 52a. The meridian 20b is fixedly coupled to the celestial equator 18 at the right ascension 12 that is indicated by reference number 62. The meridian 20c is fixedly coupled to the celestial equator at the right ascension 0 which is indicated by reference number 64. Finally, the meridian 20d is fixedly coupled to the celestial equator 18 at the right ascension 18 that is indicated by reference number 52b. It shall be appreciated by those skilled in the art, that the description of the meridians 20a, 20b, 20c and 20d is provided for illustrative purposes only. Any number of meridians may be coupled and labeled in a similar maimer.

Figure 4:
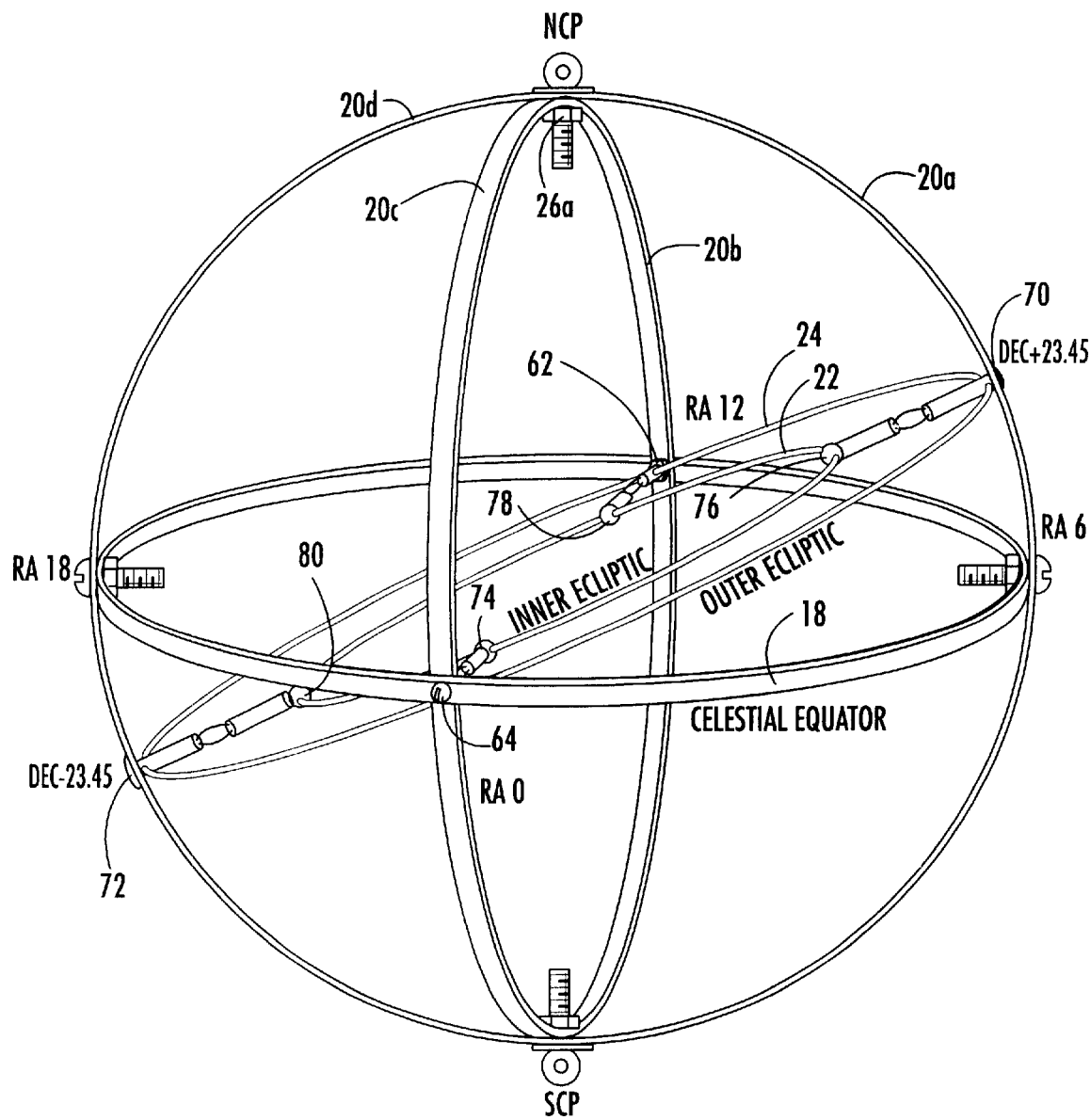
FIG. 4 is substantially a side view of the ecliptic that are part of the geocentric module.

Referring to FIG. 4 as well as FIG. 3 and FIG. 1, there is shown an outer ecliptic ring 24 that is fixedly coupled to the meridian 20a at an angle of +23.45 degrees from the celestial equator 18 which is the declination of the ecliptic and corresponds to reference number 70. Additionally, the outer ecliptic ring 24 is fixedly coupled to the meridian 20d at an angle of −23.45 degrees that corresponds to the declination of the ecliptic at referenced number 72. Furthermore, the outer ecliptic ring 24 is fixedly coupled to the celestial equator at the right ascension 0 and 12 that correspond to intersections of meridian 20c and 20d, respectively, which occur at reference numbers 64 and 62, respectively. The inner ecliptic ring 22 is fixedly coupled to the outer ecliptic ring 24 at locations 74, 76, 78, and 80 which correspond to right ascension 0, 6, 12, and 18, respectively.

Preferably, the outer ecliptic ring 24 is labeled with the 12 zodiac constellations. By way of example, Pisces is located in the area defined by the right ascension 23 to right ascension 2. Preferably, the inner ecliptic ring 22 is labeled with the all twelve months of the year.

The Heliocentric Module

Referring to FIG. 5 as well as FIG. 1 and FIG. 2, there is shown a heliocentric module 12 without the sun 18. The heliocentric module 12 includes a plurality of wires 30 fixedly coupled to the each of the legs 14 of the housing 13. Additionally, each of the plurality of wires 30 provides support for a plurality of heliocentric rings 28a, 28b, 28c, 28d and 28e. Furthermore each of the plurality of wires 30 intersects in the location of where the sun 18 is located (see FIG. 1).

The heliocentric module includes a plurality of heliocentric rings 28a, 28b, 28c, 28d and 28e that represent the orbits of the planets visible from earth. More particularly, the plurality of heliocentric rings 28a, 28b, 28c, 28d, and 28e correspond to the orbital paths of planets such as Mercury, Venus, Earth, Mars, Jupiter and Saturn. It shall be appreciated by those skilled in the art of astronomy, that Mercury, Venus, Mars, Jupiter and Saturn are readily visible from Earth. The planet Mercury travels along ring 28a. The planet Venus travels along ring 28b. Earth travels along ring 28c. The planet Mars travels along ring 28d. Jupiter and Saturn travel along ring 28e. Preferably, the ring 28e is labeled with the zodiac constellations, and ring 28c is labeled with the spring and fall equinoxes and the summer and winter solstice.

The heliocentric module includes the housing 13 that includes a plurality of legs 14. Each of the plurality of legs 14 is fixedly coupled to a coaster 69. Additionally, each of the legs 14 are fixedly coupled to one another with a ring 70 using fasteners located at reference numbers 72, 74 and 76. The ring 70 receives the geocentric module 10. The housing 13 provides a housing that holds both the geocentric module 10 and heliocentric module 12 in one astronomical model kit. It shall be appreciated by those skilled in the art, that the term "housing" as used in this patent application includes a frame that holds both the geocentric module 10 and the heliocentric module 12 together. More generally, the term housing applies to any mechanical apparatus that performs the function of coupling the geocentric module 10 and heliocentric module 12 in a single astronomical model.

Assembly of Astronomical Model

The astronomical model of the present invention provides an educational tool that is cost effective to manufacture and simple to assemble. Preferably, assembly of the geocentric module 10 and heliocentric module 12 is provided with cost effective materials that allow easy assembly. It shall be appreciated by those skilled in the art of designing astronomical models that the materials for the assembly of the astronomical model include plastic strips for the rings and meridians, a plurality of fasteners such as screws and nuts, heavy gauge wire for the constellations and for the assembly of the heliocentric module 12, labels, a plurality of wooden dowels which may be used to operatively couple the inner ecliptic ring 22 with the outer ecliptic ring 24, a plurality of spheres representing the Sun, Moon, Earth, other planets and stars, and a plurality of variously sized rods. By way of example and not of limitation, heavy gauge wire may be used to represent the constellations such as the Big Dipper or even groupings of constellations such as the Summer Triangle.

Referring to FIG. 6*a* there are shown the components for the assembly of the Sun 42 and Moon 40 (see FIG. 2) resident on the geocentric module 10. The components include a base 80 which has two pieces of felt 81 in the cavity at the bottom of the base 80, a rod 82 configured to be received in a cavity at the top of the base 80, and a sphere 84 having a cavity configured to receive the rod 82. FIG. 6*b* shows the assembly having a sphere 84 coupled to the base 80. The base 80 is movably coupled to the inner ecliptic ring 22 and the outer ecliptic ring 24.

Referring to FIG. 6*c* there is shown the components for the assembly of the planets and stars that are movably coupled to the outer ecliptic ring 24 and the meridians of the geocentric module 10. The planets and stars include a base 86 and a rod 88. The base 86 includes a cavity for receiving the rod 88 at the top of the base 86 and two pieces of felt 89 in the cavity at the bottom of the base 86. The rod 88 includes a silvered tip located at the top of the rod 88 and a blackened intermediate portion of the rod 88. At the bottom of rod 88 is an uncolored portion that is received by the base 86. FIG. 6*d* shows the assembly having a rod 88 with a silvered tip and a base 86. The base 86 is movably coupled to the outer ecliptic ring 24, the celestial equator 18, and the meridians 20.

Method of Generating Astronomical Model

Figure 7:
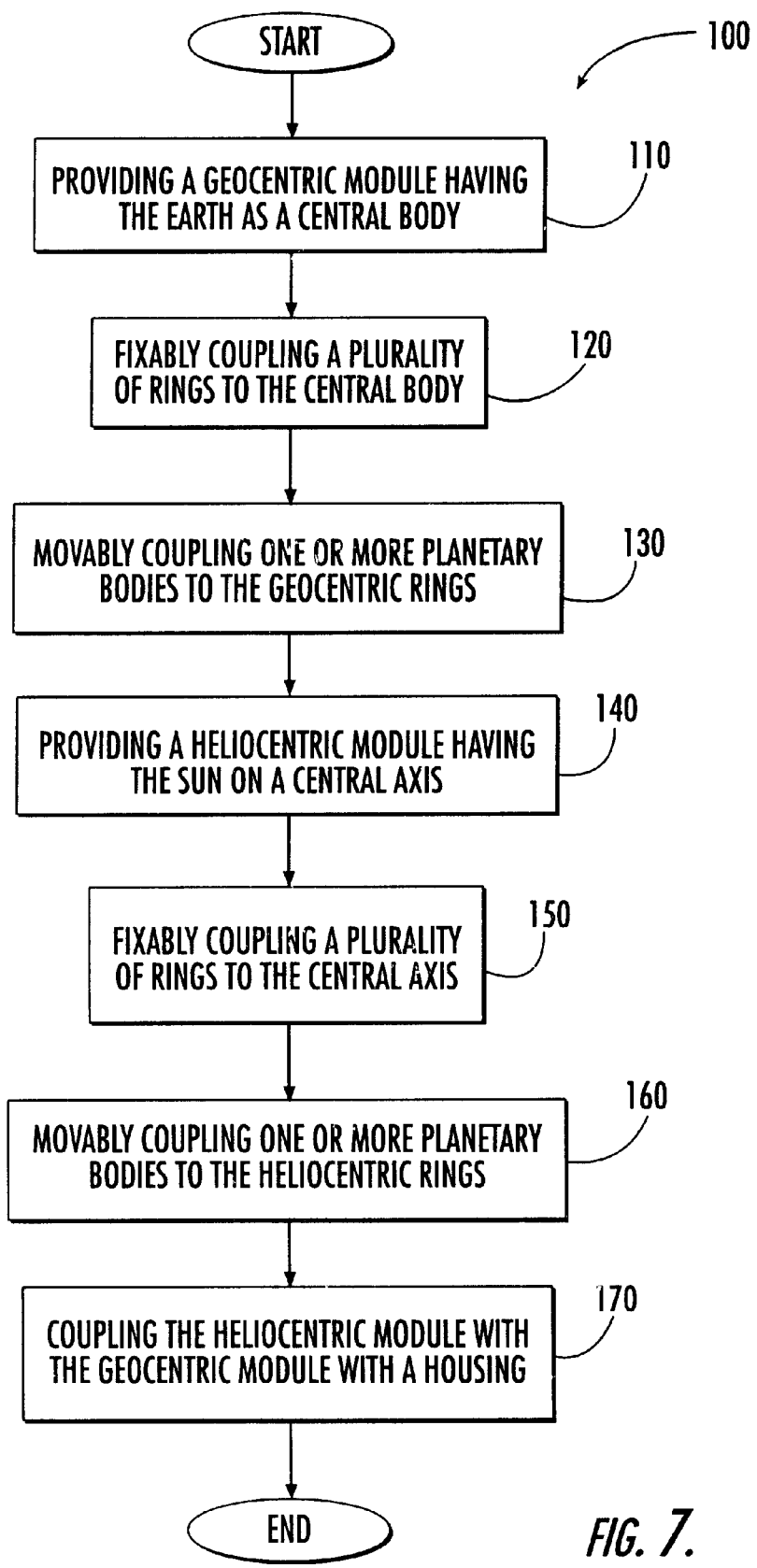
FIG. 7 is substantially a method for generating an astronomical model having a geocentric module and a heliocentric module on a shared housing.

FIG. 7 is a method for generating an interactive astronomical model 100. Referring to FIG. 1 as well as FIG. 7, the method comprises block 110 that provides a geocentric module 10 having a central body configured to represent earth 16. The geocentric module 10 provides one element of the astronomical model kit. Preferably, the geocentric module 10 is easily assembled by the user. The method then proceeds to block 120.

At block 120 the method includes fixably coupling a plurality of rings to the central body of the geocentric module 10 that is earth 16. Preferably, the rings include a plurality of meridians 20, a celestial equator ring 18, an outer ecliptic ring 24, and an inner ecliptic ring 22. The rings and meridians are fixedly coupled with fasteners as described above. The method then proceeds to block 130.

At block 130 the method includes movably coupling one or more planetary bodies to the rings or meridians of the geocentric module. Referring to FIG. 2 as well as FIG. 7, the planetary bodies include the sun 42, the moon 40, a plurality of planets 44*a* through 44*b* within the solar system, and a plurality of stars and galaxies such as 46*a* and 46*b*. Additionally, constellations may also be coupled to the geocentric module 10. The method then proceeds to block 140.

At block 140, a heliocentric module 12 is provided having a central axis that defines the location of the sun 18 (see FIG. 2). The heliocentric module 12 provides a relational tool for comparing the events in the geocentric module 10 to the events in the heliocentric module 12. The method then proceeds to block 150.

At block 150, a plurality of rings is fixably coupled to the central axis of the heliocentric module 12. The plurality of rings 28*a* through 28*e* defines the orbital paths of the five planets readily visible from earth. These planets include Mercury, Venus, Mars, Jupiter and Saturn. A more detailed description of the coupling of the rings is provided above. The method then proceeds to block 160.

At block 160, one or more planetary bodies are movably coupled to the heliocentric module 12. Using an astronomical chart, the user can establish the location of each of the planets having orbital paths defined by the rings 28*a* through 28*e*. For purposes of simplicity and due to the length of travel needed to complete a single revolution, the planets Jupiter and Saturn travel along the ring 28*e*. The method then proceeds to block 170.

At block 170, the heliocentric module 12 and the geocentric module 10 are fixedly coupled to one another with a housing 13. As previously described the housing 13 is preferably a stand that is configured to receive the geocentric module 10. The planets in the heliocentric module 12 provide the user with a visual correlation to the planets viewed on the geocentric module 10. Preferably, a two dimensional astronomical map is used to properly map the heavenly bodies associated with the heliocentric module 12 and the geocentric module 10. By way of example and not limitation, after the mapping is completed a comparison between the planets in the heliocentric module 12 and geocentric module 10 provides the viewer with a three-dimensional perspective that is not available in the two-dimensional astronomical map.

It shall be appreciated by those skilled in the art having the benefit of this disclosure that the steps for generating the interactive astronomical model do not have to be accomplished in the order described. By way of example and not of limitation, the rings and meridians may be fixedly coupled in the geocentric module 10, before the earth component is added to the geocentric module.

Operation of Astronomical Model

The operation of the astronomical model can be viewed by referring to FIG. 1 and FIG. 2. In operation, the sun 42 (see FIG. 2) revolves eastward around the earth 16 (see FIG. 2) on the outer ecliptic ring 24 (see FIG. 1). The moon 40 revolves eastward around the earth on the inner ecliptic ring 22.

The astronomical model provides a three-dimensional visual model of how an eclipse occurs. A solar eclipse can be demonstrated with the geocentric module 10 by placing the moon between the earth and sun, thereby blocking out sunlight to certain areas of the earth. A lunar eclipse is demonstrated by placing the moon on the side of the earth opposite the sun, which will cause the earth to block the sunlight from reaching the moon.

As previously described the outer ecliptic ring 24 is divided into 12 segments according to the zodiac constellations. The word zodiac means circle of animals and most of the twelve zodiac constellations are animals. The sun 42 (see FIG. 2) makes one revolution around the outer ecliptic ring 24 in 12 months. The sun 42 spends about one month in each of these constellations. When the sun 42 is in one of these regions of the sky, the constellation itself cannot be viewed from earth because bright sunlight blocks the view of the constellation. During nighttime viewing, the zodiac constellations that are six months removed from the daytime constellations are visible. For example, the sun is in Sagittarius during winter. At night around nine o'clock you will see Gemini. It shall be appreciated by those skilled in the art that the dates for each of the zodiac constellations represent when the sun is in that constellation, not when that constellation is viewed in the evening sky.

The celestial equator 18 represents the outward extension our earth's equator. The earth's equator is perpendicular to its axis of rotation that passes through its geographic North and South Poles. Extending the Earth's axis of rotation established the north celestial pole (NCP) 26a (see FIG. 1) and the south celestial pole (SCP) 26b (see FIG. 2). The NCP and the SCP are each 90 degrees from the celestial equator 18.

The celestial equator 18 forms an angle of 23.45 degrees with the ecliptic rings. As the earth, with its titled axis of rotation, revolves around the sun of the ecliptic plane, seasonal variations in climate occur. During the winter solstice, the Northern Hemisphere is tilted farthest south of the celestial equator 18. During the summer solstice, the Northern Hemisphere is tilted toward the sun and summer occurs.

At the equinoxes the earth's axis points neither toward nor away from the sun. These two points are found on the celestial sphere where the outer ecliptic ring 24 crosses the celestial equator 18 (see FIG. 1). The spring or vernal equinox occurs in the Northern Hemisphere when the sun is ascending toward the summer solstice. The fall or autumn equinox occurs when the sun is traveling downward along the outer ecliptic ring 24 toward the winter solstice. Equinox means equal day and night and occurs at these two points.

The concept of precession of the equinoxes is difficult to visualize, but can be demonstrated with the geocentric module 10. As the earth spins on its axis, it also precesses in a circle like a spinning top. The earth's North Pole projects along the earth's axis of rotation to the NCP, and likewise, the earth's South Pole projects to the SCP. As the earth precesses, its axis of rotation will draw a circle that delineates the changing position of the NCP and the SCP. A nearly complete circle is drawn about every 26 thousand years. The mean that our North Star will not always be Polaris. In 10 thousand years it will be Vega. While the NCP and SCP change as the earth precesses, so do the equinoxes and solstices. Just as the earth's axis of rotation changes its direction the projection of the earth's equator to the celestial sphere changes. The points change where the CE intersects the ecliptic. Approximately every two thousand years the Spring Equinox will be located in a different zodiac constellation. In the year 2700 it will be in Aquarius instead of Pisces. The date remains about the same, March 20$^{th}$, but the constellation changes.

Another way to visualize the concept of precession is to label the inner ecliptic circle with the 12 months of the year. As viewed from the Northern Hemisphere, as the earth precessed clockwise, imagine the outer ecliptic ring, which is labeled with the zodiac constellations rotating slowly counter-clockwise. The equinox at March 20 will not change, but the location of the zodiac constellations will change, and Aquarius will gradually approach the spring equinox. Approximately two thousand years after that, Capricorn will be at the spring equinox.

The geocentric module 10 can also be used to help visualize the phases of the moon 40 (see FIG. 2) from new moon to full moon. These phases can be demonstrated in the geocentric module by rotating the black and gray moon on its wooden axis. This is just a representation achieved by rotating the little moon clockwise. In actuality, the moon rotates in the same direction as it orbits the earth, counter-clockwise.

The geocentric module can also explain the different times that the moon appears in the sky. By way of example and not of limitation, the moon is placed at its first quarter position that is one quarter of the way around the inner ecliptic, east of the sun. The user may them place their reference for a line of sight at the moon 40 and look towards the earth. The earth is then slowly rotated counter-clockwise for the Northern Hemisphere, and the user is presented with the time of moonrise in the east. Typically, the moonrise is about noontime when it is in its first quarter. If the viewer continues viewing from the moon reference point and slowly rotate the earth until a reference point on the earth disappears, then this corresponds to the time of moonset in the west.

Another concept that may be taught with the geocentric module 10 is the concept of a horizon. By way of example, a person located at the Earth's North Pole cannot see the night time stars over the South Pole because the Earth blocks this view. The most a person can see from the North Pole are those stars north of the celestial equator 18. This is a 180-degree plane drawn tangentially through the observer's location that defines the horizon.

The geocentric module also provides an instructive tool which allows a person to study the heavens from the viewpoint of someone who lives in the Southern Hemisphere and where the earth is seen to rotate clockwise, and the moon and sun revolve around clockwise. Precession of the earth's axis is counter-clockwise.

The geocentric module 10 can also help understand the analemma. The word comes from the Greek word meaning support or base. A vertical stand is used to mark the sun's shadow at noontime once or twice monthly through the year. A diagram can then be made of the sun's position throughout the year. This is used to help tell the correct time. In the Northern Hemisphere the sun will be high in the sky in the summer, low in the sky in the winter, and at intermediate positions throughout the rest of the year. In the winter months in the Northern Hemisphere, when the earth is closest to the sun, the earth travels the fastest in its orbit about the sun. Since the earth orbits the sun in an elliptical figure, the earth speeds up when it is nearer to the sun. According to the geocentric module, the sun moves eastward at its greatest velocity during the winter months. In the summer months, when the earth is farthest from the sun, the sun moves at its slowest velocity eastward across the sky. These variations in the vertical and horizontal position of the sun throughout the year contribute to the figure eight that the analemma forms. Those of ordinary skill in the art shall appreciate that a host of astronomy treatises describe the analemma.

The geocentric module also provides a three-dimensional model of the sun's movements across the sky. The most obvious movement viewed from earth each day is the rising of the sun in the east and its movement westward to set in the west. The other, less obvious movement of the sun is its yearly eastward progression caused by the earth's orbit around the sun.

One final concept that may be visualized with the geocentric module is concept of sidereal time which is referred to as star time. It shall be appreciated by those skilled in the art that the earth averages one rotation every 24 hours in relation to the sun, which is a solar day; but it takes about four minutes less than this in relation to the stars, which is sidereal day. This concept is displayed in the geocentric module 10 by placing the sun on the outer ecliptic ring above Orion at RA 6. The Earth is then rotated once. Orion has not moved. However, the sun has moved east about one degree, because in roughly 365 days the sun will make a complete revolution of 360 degrees.

The combination of the heliocentric module 12 and the geocentric module 10 provides for a relational representation of the visible planets in Earth's solar system. The five planets visible to the naked eye include Mercury, Venus, Mars, Jupiter and Saturn. The relational representation is provided by having a first reference point that uses the earth as the central body and a second reference point that uses the sun, and then housing the modules on the same astronomical kit for easy comparative analysis.

The heliocentric module 12 provides five rings 28a through 28e that represent the orbits of the five visible planets and Earth. As previously described, Jupiter and Saturn occupy the same orbit with ring 28e. By way of example and not of limitation, Jupiter and Saturn will remain in the constellations Taurus and Aries throughout this year 2001. Venus will be seen in almost every zodiac constellation before the end of a 12 month period. It shall be appreciated by those skilled in the art that the five visible planets orbit very close to the angle of the outer ecliptic ring 24. An astronomical chart is used to provide assistance in locating the planets in the geocentric module 10 and in the heliocentric module 12. It shall be appreciated by those skilled in the art that the planets in the geocentric module 10 may be tied to either the outer ecliptic ring 24 or one of the meridians 20 or the celestial equator 18. It shall also be appreciated by those skilled in the art that the planets in the heliocentric module 12 are movably coupled to rings 28a through 28e to visualize and compare with the planets in the geocentric module 10.

CONCLUSION

Although the description above contains many specifications, these should not be construed as limiting the scope of the invention but as merely providing illustrations of some of presently preferred embodiments of this invention. Thus, the scope of the invention should be determined by the appended claims and their legal equivalents rather than by the examples given.

What is claimed is:

1. An astronomical model, comprising:
  (A) a geocentric module having a central body configured to represent earth;
  (B) a heliocentric module having a central body configured to represent a sun; and
  (C) a housing coupled to said geocentric module and said heliocentric module,
wherein said geocentric module further comprises a plurality of rings configured to represent a plurality of orbits, said central body of the geocentric module being positioned substantially in the center of the rings.

2. The astronomical model of claim 1, wherein said geocentric module further comprises a plurality of bodies, wherein each of said plurality of bodies is movably coupled to one of said plurality of rings.

3. The astronomical model of claim 1, wherein said plurality of rings includes an ecliptic ring, an equatorial ring, and a plurality of meridians.

4. The astronomical model of claim 1, wherein said heliocentric module further comprises a plurality of rings configured to represent a plurality of orbits.

5. The astronomical model of claim 4, wherein said heliocentric module further comprises a plurality of bodies, wherein each of said plurality of bodies is movably coupled to one of said plurality of rings.

6. The astronomical model of claim 1, wherein said housing is a stand fixedly coupled to said geocentric module and said heliocentric module.

7. An astronomical model, comprising:
  a geocentric module having a central body configured to represent earth;
  a heliocentric module having a central body configured to represent a sun, the heliocentric module further having a plurality of rings, the plurality of rings defining a common center, the central body of the heliocentric module being positioned substantially in the common center defined by the plurality of rings, the plurality of rings further being on a substantially common plane; and
  a housing coupled to said geocentric module and said heliocentric module.

8. The astronomical model of claim 7, wherein said geocentric module further comprises a plurality of first rings configured to surround said central body and configured to represent a plurality of geocentric orbits.

9. The astronomical model of claim 8, wherein said geocentric module further comprises a plurality of first bodies, wherein each of said plurality of first bodies being movably coupled to one of said plurality of first rings.

10. The astronomical model of claim 9, wherein said plurality of first rings includes an ecliptic ring, an equatorial ring, and a plurality of meridians.

11. The astronomical model of claim 10, wherein said heliocentric module further comprises a plurality of second rings which surround said central axis and are configured to represent a plurality of heliocentric orbits.

12. The astronomical model of claim 11, wherein said heliocentric module further comprises a plurality of second bodies, wherein each of said plurality of second bodies is movably coupled to one of said plurality of second rings and each of said plurality of second bodies represents a planet.

13. The astronomical model of claim 12, wherein said housing is a stand fixedly coupled to said geocentric module and said heliocentric module.

14. A method for generating an interactive astronomical model, comprising:
  providing a geocentric module having a central body configured to represent earth;
  providing a heliocentric module having a central body configured to represent a sun;

providing a plurality of second rings around the central body of the heliocentric module, the plurality of second rings being on a substantially common plane; and coupling said geocentric module with said heliocentric module with a shared housing.

15. The method of claim 14, wherein said providing of a geocentric module further comprises fixably coupling a plurality of first rings about said central body.

16. The method of claim 15, wherein said fixably coupling of a plurality of first rings includes an ecliptic ring, an equatorial ring and a plurality of meridian rings.

17. The method of claim 16, wherein said providing of a geocentric module further comprises movably coupling at least one first body to one of said plurality of first rings.

18. The method of claim 14, wherein said providing of a heliocentric module further comprises fixably coupling a plurality of second rings about said central axis.

19. The method of claim 18, wherein said providing of a heliocentric module further comprises movably coupling at least one second body to one of said plurality of second rings.

* * * * *